(12) United States Patent
Ishiwatari

(10) Patent No.: US 7,434,399 B2
(45) Date of Patent: Oct. 14, 2008

(54) SUPERCHARGING PRESSURE CONTROLLER FOR ENGINE

(75) Inventor: Yuji Ishiwatari, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 53 days.

(21) Appl. No.: 11/437,618

(22) Filed: May 22, 2006

(65) Prior Publication Data

US 2006/0260305 A1   Nov. 23, 2006

(30) Foreign Application Priority Data

May 20, 2005   (JP)   ............... 2005-147789

(51) Int. Cl.
*F02D 23/00*   (2006.01)
*F02B 33/44*   (2006.01)

(52) U.S. Cl. .......................... 60/608; 60/602
(58) Field of Classification Search ............ 60/608, 60/602
See application file for complete search history.

(56) References Cited

U.S. PATENT DOCUMENTS

| | | | |
|---|---|---|---|
| 6,637,205 B1 * | 10/2003 | Ahmad et al. ................ | 60/608 |
| 6,705,084 B2 * | 3/2004 | Allen et al. .................. | 60/608 |
| 6,880,337 B2 | 4/2005 | Masuda | |
| 2005/0144947 A1 | 7/2005 | Masuda | |
| 2006/0066287 A1 * | 3/2006 | Obayashi et al. ............. | 322/25 |
| 2006/0123784 A1 * | 6/2006 | Algrain ....................... | 60/608 |
| 2006/0196182 A1 * | 9/2006 | Kimoto et al. ............ | 60/605.1 |
| 2006/0196183 A1 * | 9/2006 | Isogai ......................... | 60/607 |
| 2006/0260304 A1 * | 11/2006 | Ishiwatari .................... | 60/599 |

FOREIGN PATENT DOCUMENTS

| | | | |
|---|---|---|---|
| JP | 3-115738 | | 5/1991 |
| JP | 03115738 A | * | 5/1991 |

* cited by examiner

*Primary Examiner*—Thomas Denion
*Assistant Examiner*—Mary A Davis
(74) *Attorney, Agent, or Firm*—Nixon & Vanderhye PC

(57) ABSTRACT

A supercharging pressure controller of an internal combustion engine estimates time to execute a process of bringing power supplied to an assist motor to zero based on delay characteristics of actual emission energy immediately before actual supercharging pressure reaches target supercharging pressure. The supercharging pressure controller sets a gradient of a power gradual reduction waveform in a power gradual reduction control period at a gradient for bringing the power supplied to the assist motor to zero at the estimated time. Thus, the power supplied to the assist motor gradually reduces at the predetermined gradient over time finally to zero at the estimated time. The assist motor is turned off while the actual supercharging pressure follows the target supercharging pressure, without wastefully consuming electric energy.

19 Claims, 5 Drawing Sheets

SUPERCHARGING PRESSURE CONTROLLER FOR ENGINE

CROSS REFERENCE TO RELATED APPLICATION

This application is based on and incorporates herein by reference Japanese Patent Application No. 2005-147789 filed on May 20, 2005.

BACKGROUND OF THE INVENTION

1. Field of the Invention

The present invention relates to a supercharging pressure controller for an internal combustion engine that drives a rotational shaft or a compressor of a turbocharger with a motor to achieve desired supercharging pressure.

2. Description of the Related Art

In order to increase power output and to reduce fuel consumption, a vehicle such as an automobile is equipped with a turbocharger engine, which uses a compressor of a turbocharger to supercharge intake air suctioned into engine cylinders. The turbocharger uses emission energy of exhaust gas flowing out of the cylinders of the internal combustion engine to rotate a turbine and to drive a compressor mounted coaxially with the turbine. Thus, the turbocharger supercharges the intake air suctioned into the cylinders of the engine. The supercharging pressure rises slowly and actual supercharging pressure is low in a low rotation speed range of the engine. As a result, charging efficiency is decreased and improvement of engine output is insufficient.

For the purpose of resolving this disadvantage, a certain supercharging pressure controller for an internal combustion engine drives a rotational shaft of a turbocharger with an electric motor to achieve desired supercharging pressure. Another supercharging pressure controller for an internal combustion engine has an auxiliary compressor in an engine intake pipe in addition to a usual compressor of a turbocharger and drives the auxiliary compressor with a motor to achieve the desired supercharging pressure.

However, in the conventional supercharging pressure controller for the engine, the target supercharging pressure cannot be maintained if electric power (motor power) W supplied to the motor is turned off immediately at time A when the actual supercharging pressure reaches the target supercharging pressure as shown in a time chart of FIG. 9C. It is because there is a delay in increase of emission energy and turbine rotation speed decreases compared to the value at the time when the turbine is driven by the motor, causing a drop in the actual supercharging pressure.

Therefore, a further supercharging pressure controller for an internal combustion engine (for example, as described in JP-A-2004-169629) gradually reduces the motor current from present motor current (maximum motor current) finally to zero if the actual supercharging pressure exceeds the target supercharging pressure.

However, since the supercharging pressure controller described in JP-A-2004-169629 supplies the maximum motor current until the actual supercharging pressure exceeds the target supercharging pressure, the actual supercharging pressure overshoots the target supercharging pressure. This supercharging pressure controller executes motor current control based on a deviation between the actual supercharging pressure and the target supercharging pressure if the actual supercharging pressure becomes equal to or lower than the target supercharging pressure during processing of gradually reducing the motor current. In consequence, even if the motor current approaches zero once, the motor current increases again. Thus, the motor rotation speed decreases and increases, causing hunting. Further, the motor current cannot be turned off over a long period. Thus, the electric energy used for the motor current control is wasted, resulting in poor fuel economy.

SUMMARY OF THE INVENTION

It is an object of the present invention to provide a supercharging pressure controller for an internal combustion engine capable of turning off a motor while actual supercharging pressure follows target supercharging pressure, thereby inhibiting wasteful consumption of electric energy leading to poor fuel economy.

According to an aspect of the present invention, a process of decreasing drive torque of a motor at a predetermined gradient is started based on actual emission energy applied to a turbine immediately before actual supercharging pressure reaches target supercharging pressure. Thus, the drive torque of the motor reduces at the predetermined gradient while the actual supercharging pressure follows the target supercharging pressure, preventing the actual supercharging pressure from overshooting the target supercharging pressure. In consequence, wasteful consumption of electric energy can be eliminated, thus preventing poor fuel economy.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
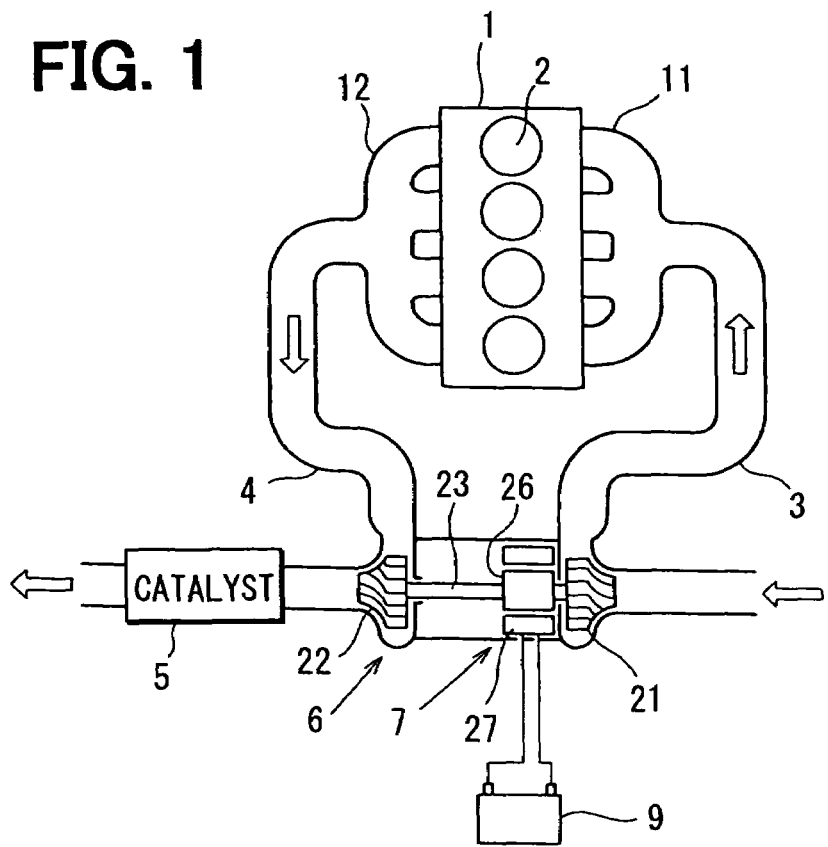
FIG. 1 is a schematic diagram showing a turbocharger engine and its peripheral devices according to a first example embodiment of the present invention.

Referring to FIG. 1, a control system of a turbocharger engine according to a first example embodiment of the present invention is illustrated. A control structure of the control system of the turbocharger engine of FIG. 1 is shown in FIG. 2.

Figure 2:
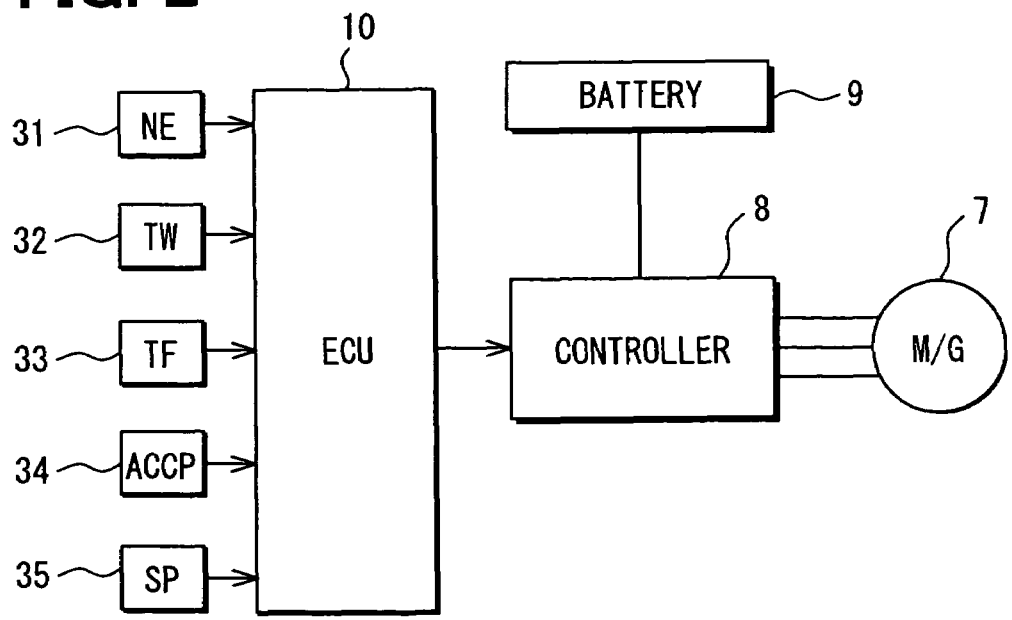
FIG. 2 is a block diagram showing a control structure of a control system of the turbocharger engine according to the FIG. 1 embodiment.

As shown in FIGS. 1 and 2, the turbocharger engine control system has an exhaust emission purifier, a turbocharger 6, a motor generator (M/G, assist motor) 7, and an engine control unit (ECU) 10. The exhaust emission purifier purifies exhaust gas discharged from an internal combustion engine 1 such as a diesel engine and is mounted in a vehicle such as an automobile. The turbocharger 6 uses emission energy E of the exhaust gas discharged from the engine 1 to supercharge intake air suctioned into combustion chambers 2 of respective cylinders of the engine 1. The assist motor 7 electrically drives the turbocharger 6 to assist the supercharging. The ECU 10 incorporates a motor controller that regulates the electric power supplied to the assist motor 7 to control drive torque (motor drive torque) of the assist motor 7.

The engine 1 is a direct injection diesel engine that injects fuel directly into the combustion chambers 2. The engine 1 has an engine intake pipe 3 and an engine exhaust pipe 4 communicating with the combustion chambers 2 of the respective cylinders of the engine 1. The engine 1 has intake valves (not shown) for opening/closing intake ports and exhaust valves (not shown) for opening/closing exhaust ports. The intake air is supplied to the intake ports of the engine 1 through an intake passage formed in the engine intake pipe 3 including an intake manifold 11. The exhaust gas is discharged into an exhaust passage formed in the engine exhaust pipe 4 including an exhaust manifold 12.

The turbocharger engine control system has a common rail fuel injection apparatus (not shown) for injecting and supplying high-pressure fuel into the combustion chambers 2 of the respective cylinders of the engine 1. The common rail fuel injection apparatus has a common rail (not shown), a supply pump (fuel injection pump, not shown), and multiple injectors (INJ, not shown). The common rail accumulates fuel under a high pressure corresponding to fuel injection pressure. The supply pump pressurizes the fuel suctioned into a pressurizing chamber through a suction control valve (SCV, not shown) functioning as an actuator to high pressure and then pressure-feeds the high-pressure fuel to the common rail. Each injector injects the high-pressure fuel accumulated in the common rail into the combustion chamber 2 of each cylinder of the engine 1. The injector has a nozzle needle (valve member) and an actuator such as an electromagnetic valve for driving the nozzle needle in a valve-opening direction.

The exhaust emission purifier is placed in the engine exhaust pipe 4 downstream of the turbocharger 6 with respect to an exhaust gas flow direction. The exhaust emission purifier has a diesel particulate filter (DPF, not shown) and a catalytic converter case 5, for example. The DPF collects exhaust particulate matters (PM) contained in the exhaust gas. The catalytic converter case 5 is placed upstream of the DPF with respect to the exhaust gas flow direction for housing an oxidation catalytic converter (not shown).

The turbocharger 6 has a compressor 21 placed in the engine intake pipe 3 and a turbine 22 placed in the engine exhaust pipe 4. The turbine 22 rotates integrally with the compressor 21 via a rotor shaft (turbine shaft) 23. An air-cooling/water-cooling intercooler 24 may be provided in the engine intake pipe 3 for cooling the intake air heated through compression (supercharging) at the compressor 21 (as in a third example embodiment shown in FIG. 7).

The compressor 21 is attached to an axial end of the rotor shaft 23 and has a compressor wheel having multiple compressor blades. The compressor wheel is rotatably housed in a compressor housing to supercharge the intake air flowing through the engine intake pipe 3. An intake air supply passage in the compressor housing is formed in a spiral shape along a rotation direction of the compressor wheel so as to surround the outer periphery of the compressor wheel.

The turbine 22 is attached to the other axial end of the rotor shaft 23 and has a turbine wheel having multiple turbine blades. The turbine wheel is rotatably housed in a turbine housing and is rotated by the exhaust gas flowing through the engine exhaust pipe 4. An exhaust gas discharge passage in the turbine housing is formed in a spiral shape along a rotation direction of the turbine wheel so as to surround the outer periphery of the turbine wheel. The assist motor 7 is attached to the rotor shaft 23 between the compressor 21 and the turbine 22.

The assist motor 7 is a motor generator having a function of an electric motor for assisting the supercharging by rotating the rotor shaft 23 such that the compressor 21 and the turbine 22 are driven and rotated and a function of a generator, which is driven and rotated by the emission energy of the engine 1 to produce regenerative electric power. The assist motor 7 is an AC motor such as a three-phase induction motor generator having a rotor 26 integrated with the rotor shaft 23 and a stator 27 opposed to the outer periphery of the rotor 26. The rotor 26 has a rotor core having a permanent magnet. The stator 27 has a stator core, around which a three-phase stator coil is wound.

The assist motor 7 functions as the electric motor when the supercharging assist is necessary. At that time, the assist motor 7 is electrically connected to the ECU 10 through an electric power converter (controller) 8. The assist motor 7 functions as the generator when the supercharging assist is unnecessary. At that time, the assist motor 7 is electrically connected through the controller 8 to a battery 9 and other electrical equipment mounted on the vehicle.

The ECU 10 shown in FIG. 2 includes a microcomputer with a known structure having functions of CPU for performing control processing and arithmetic processing, a storage device (e.g., a volatile memory such as SRAM or DRAM or a nonvolatile memory such as EPROM, EEPROM or a flash memory) for storing control program or control logics and data, an input circuit, an output circuit, a power source circuit and the like. When an ignition switch is turned on (IG.ON), the ECU 10 feedback-controls the fuel pressure in the common rail (common rail pressure), the actual supercharging pressure (actual intake pressure), the air intake amount and the like to control command values respectively based on the control programs or the control logic stored in the memory.

A pump drive circuit and an injector drive circuit are provided between the ECU 10 and actuators of respective systems. The pump drive circuit applies SCV drive current to the suction control valve of the supply pump. The injector drive circuit applies INJ drive current to the electromagnetic valve of the injector. The controller 8 is provided between the ECU 10 and the assist motor 7 of the turbocharger 6. The controller 8 has a DC-DC converter for stepping up the DC power of the battery 9, an inverter for variably controlling rotation speed of the assist motor 7 by converting the stepped-up DC power into AC power of a predetermined frequency, and a rectifying circuit for rectifying alternating current output from the three-phase stator coil of the assist motor 7 into direct current.

The DC-DC converter can step down DC voltage output from the rectifying circuit and then smooth it into steady battery voltage. The inverter is a rotation speed controller that varies the electric power (drive current value, output current of the inverter) supplied to the three-phase stator coil of the assist motor 7 based on a control signal supplied from the ECU 10 to control the rotation speed of the rotor shaft 23 of the assist motor 7. The controller 8 has a function of calculating the rotation speed of the rotor shaft 23 of the turbocharger 6 (or the assist motor 7) based on the electric power supplied to the three-phase stator coil of the assist motor 7. A rotation speed sensor may be provided for transforming the rotation speed of the rotor shaft 23 of the turbocharger 6 (or the assist motor 7) into an electric signal and outputting it.

The A/D converter performs A/D conversion of sensor signals of various sensors such as a crank angle sensor 31 that senses a rotational angle (crank angle) of a crankshaft of the engine 1, a cooling water temperature sensor 32 that senses temperature TW of the engine cooling water, a fuel temperature sensor 33 that senses temperature TF of the fuel, and the like. The sensor signals are input to the microcomputer incorporated in the ECU 10 after the A/D conversion. The crank angle sensor 31 has a pickup coil for transforming the crank angle of the engine 1 into an electric signal and outputs an NE pulse signal for each 30° CA (crank angle), for example. The ECU 10 measures a time interval between the NE pulse signals output from the crank angle sensor 31 and thus functions as an engine speed sensing device for sensing engine rotation speed (engine rpm) NE.

The ECU 10 is connected to an accelerator position sensor 34 that transforms an accelerator manipulation degree (accelerator position, accelerator depressed amount) ACCP provided by a vehicle driver into an electric signal (accelerator position signal) and outputs the depressed amount of the accelerator to the ECU 10. The electric signal (accelerator position signal) output from the accelerator position sensor 34 is sent to the microcomputer after undergoing the A/D conversion at the A/D converter like the other sensor signals. The ECU 10 is also connected to a supercharging pressure sensor 35 for sensing the supercharging pressure SP of the intake air supercharged by the turbocharger 6. The supercharging pressure sensor 35 transforms the intake pressure (actual supercharging pressure, actual intake pressure) in the engine intake pipe 3 into an electric signal and outputs the electric signal. The electric signal (sensor signal) output from the supercharging pressure sensor 35 is sent to the microcomputer after undergoing the A/D conversion at the A/D converter like the other sensor signals.

The ECU 10 has a function (injection amount setting device) of calculating a target injection amount (command injection amount) QFIN by adding an injection amount correction value, which is set in consideration of the engine cooling water temperature TW, the fuel temperature TF and the like, to a basic injection amount Q set in accordance with the engine rpm NE and the accelerator position ACCP. The ECU 10 has a function (injection timing setting device) of calculating command injection timing TFIN in accordance with the engine rpm NE and the command injection amount QFIN. The ECU 10 has a function (injection period setting device) of calculating injection command pulse length (command injection period) TQFIN corresponding to an energization period of the electromagnetic valve of the injector in accordance with the command injection amount QFIN and the common rail pressure PC, which is sensed by a fuel pressure sensor (not shown) mounted to the common rail.

The ECU 10 also has a function (fuel pressure controlling device) of calculating the optimum fuel injection pressure corresponding to the operating state of the engine 1 and driving the suction control valve of the supply pump through the pump drive circuit. The ECU 10 has a function (fuel pressure setting device) of calculating target fuel pressure PFIN in accordance with the command injection amount QFIN and the engine rpm NE. In order to achieve the target fuel pressure PFIN, the ECU 10 regulates the pump drive current applied to the suction control valve and feedback-controls the fuel discharge amount discharged by the supply pump.

Next, a control method of the turbocharger engine control system according to the present embodiment will be explained with reference to FIGS. 1 to 6A.

First, various sensor signals necessary for calculating an operating state or operation conditions of the engine 1, information about the operation of the engine 1 and information about the operation of respective systems are input. For example, the engine rpm, the accelerator position, the command injection amount, the target fuel pressure and the like are read. The engine rpm is sensed by measuring the time interval between the NE pulse signals output from the crank angle sensor 31. The command injection amount is calculated by adding the injection amount correction value, which is set in consideration of the fuel temperature, the engine cooling water temperature and the like, to the basic injection amount set in accordance with the engine rpm and the accelerator position.

Then, a change rate of the accelerator position is calculated from the accelerator position. The change rate of the accelerator position is obtained from a change per unit time in the accelerator position sensed by the accelerator position sensor 34. Then, in order to determine whether the supercharging assist is necessary, an acceleration state, a steady state or a deceleration state of the vehicle is determined. For example, it is determined whether the change rate of the accelerator position is equal to or greater than a predetermined value. For the purpose of determining whether the supercharging assist is necessary, it may be determined whether the engine rpm is in a low rotation speed range or a high rotation speed range.

If the change rate of the accelerator position is less than the predetermined value, it is determined that the vehicle is in the steady state or deceleration state in which the supercharging assist is unnecessary. In this case, the assist motor 7 is switched to regenerative power generation mode in which the turbocharger 6 drives and rotates the assist motor 7. If the three-phase stator coil of the assist motor 7 is energized (ON) until the previous control cycle, the three-phase stator coil is de-energized (OFF). If the three-phase stator coil of the assist motor 7 is de-energized before the previous control cycle, the de-energized state of the three-phase stator coil is maintained. The turbocharger 6 in the regenerative power generation mode functions as a usual turbocharger that uses only the emission energy of the exhaust gas discharged from the engine 1.

Figure 4:
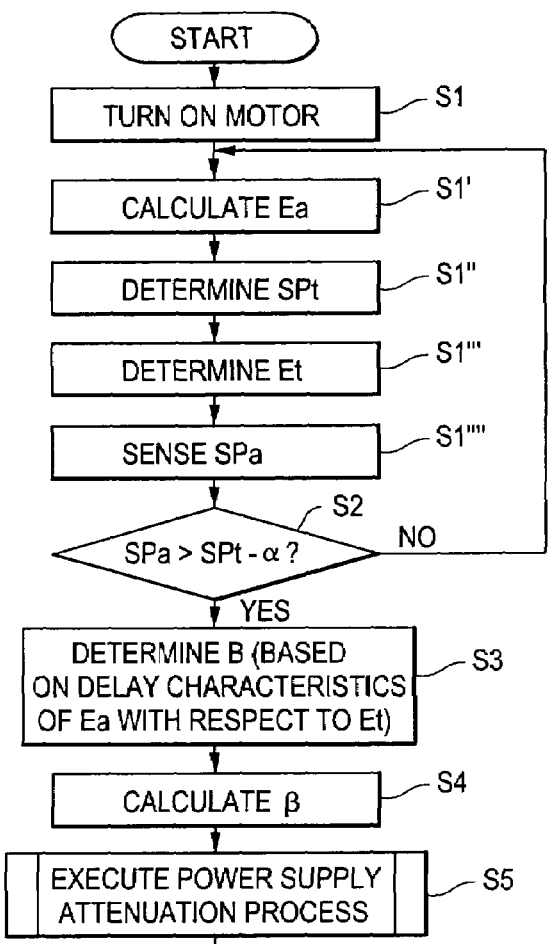
FIG. 4 is a flowchart showing a method of controlling rotation speed of an assist motor according to the FIG. 1 embodiment.
Figure 5:
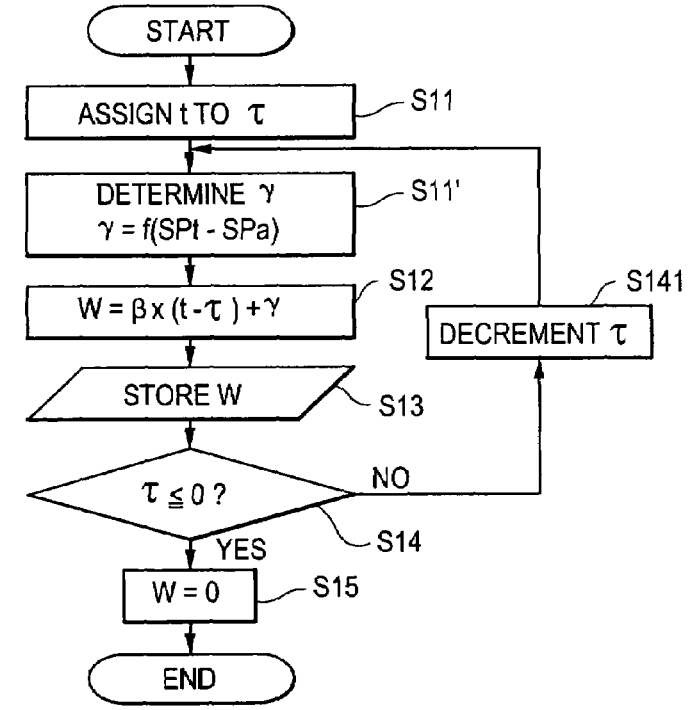
FIG. 5 is a flowchart showing a method of gradual reduction processing of electric power supplied to the assist motor according to the FIG. 1 embodiment.

If the change rate of the accelerator position is equal to or greater than the predetermined value, it is determined that the vehicle is in the acceleration state, in which the supercharging assist is necessary. In this case, the assist motor 7 is switched to the supercharging assist mode, in which the assist motor 7 drives and rotates the compressor 21 and the turbine 22 of the turbocharger 6. Then, control routines shown in FIG. 4 and FIG. 5 are executed to regulate the electric power supplied to the three-phase stator coil of the assist motor 7, thereby controlling the rotation speed of the assist motor 7. FIGS. 4 and 5 are flowcharts showing a control method of the rotation speed (motor speed) of the assist motor 7. The control routines shown in FIGS. 4 and 5 are repeated in a predetermined control cycle in the supercharging assist mode.

First, an electric signal output from the supercharging pressure sensor 35 is input to sense the actual supercharging pressure SPa. Then, the target supercharging pressure SPt is calculated in accordance with the engine rpm and the command injection amount (or accelerator position). The target supercharging pressure SPt may be read from a map of relationships therebetween, the map previously obtained through experimentation or the like. Then, target rotation speed of the assist motor 7 is calculated in accordance with a deviation between the target supercharging pressure SPt and the actual supercharging pressure SPa sensed by the supercharging pressure sensor 35. Then, the electric power (motor power) W that is supplied to the three-phase stator coil of the assist motor 7 and is necessary for substantially conforming the rotation speed of the assist motor 7 to the target rotation speed is calculated. The motor power W is calculated by using a value of drive current applied to the three-phase stator coil of the assist motor 7 (i.e., an inverter output current value) and a value of voltage applied to the three-phase stator coil of the assist motor 7.

Figure 3:
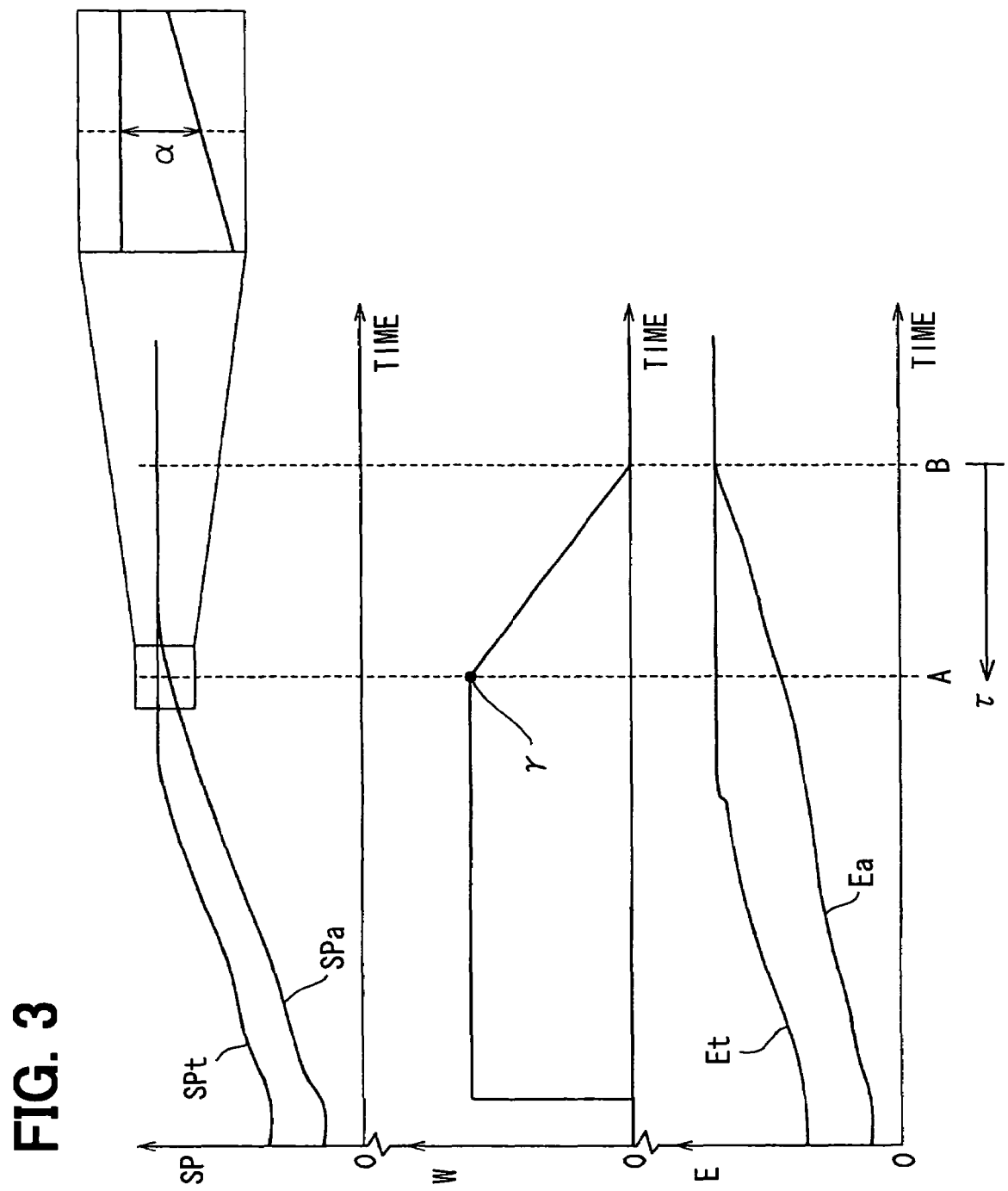
FIG. 3 is a time chart showing a method of controlling supercharging pressure of the turbocharger engine according to the FIG. 1 embodiment.

Then, the ECU 10 outputs a power supply command to the controller 8. Thus, the controller 8 applies the calculated supply power (calculated motor power) W to the three-phase stator coil of the assist motor 7 as shown in FIG. 3. Power supply (energization) to the three-phase stator coil of the assist motor 7 is executed (ON) in order to substantially conform the motor speed (actual rotation speed) of the assist motor 7 to the target rotation speed at Step S1 in FIG. 4. Actual emission energy Ea, target supercharging pressure SPt, target emission energy Et and actual supercharging pressure SPa are determined at S1', S1'', S''' and S1'''' respectfully. Thus, as the actual supercharging pressure Spa decreases compared to the target supercharging pressure SPt, the rotation speed of the assist motor 7 is increased. Hence, even if the engine rpm is in a low speed range, the assist motor 7 executes the supercharging assist to compensate for a shortage of the actual supercharging pressure Spa, thereby substantially conforming the actual supercharging pressure Spa to the target supercharging pressure SPt. As a result, the charging efficiency is improved and the engine output is enhanced.

Then, it is determined whether time A immediately before the time, at which the actual supercharging pressure SPa reaches the target supercharging pressure SPt, is reached. For example, it is determined whether the actual supercharging pressure SPa falls within a specific range from the target supercharging pressure SPt. More specifically, it is determined whether the actual supercharging pressure SPa exceeds a predetermined value (target supercharging pressure SPt minus α) at Step S2. The specific range from the target supercharging pressure SPt, or a value smaller than the target supercharging pressure SPt by α, is arbitrarily set in accordance with various purposes, such as a need to smoothly and quickly converge the actual supercharging pressure SPa to the target supercharging pressure SPt or a need to prevent the actual supercharging pressure SPa from overshooting the target supercharging pressure SPt. For example, a tolerance of the overshooting is used as a guide of the setting.

If Step S2 is NO, the process at Step S2 is repeated. If Step S2 is YES, pre-stored times B1 to Bn (shown in FIG. 6A), at which processing for bringing the power supply to the three-phase stator coil of the assist motor 7 to zero is performed, are accessed. The times B1 to Bn are based on delay characteristics of actual emission energy Ea with respect to target emission energy Et necessary for obtaining the target supercharging pressure SPt and the appropriate value of B is determined at Step S3. The delay characteristics of the actual emission energy Ea are previously measured through experiments such as engine tests to create a map, which is stored in a storage device (e.g., volatile memory such as DRAM or a nonvolatile memory such as EEPROM).

Then, at Step S4, a gradient (β) of a supply power attenuation waveform (power gradual reduction waveform) used in supply power attenuation process is set at a gradient (downward-sloping linear gradient shown in FIG. 3), at which the power W supplied to the assist motor 7 becomes zero at the previously determined time B. Then, the supply power attenuation process (control routine shown in FIG. 5) is executed. The process is performed to gradually reduce the power W supplied to the three-phase stator coil of the assist motor 7 over time during a power gradual reduction control period from time A to time B at Step S5. Thereafter, the process exits the control routine shown in FIG. 4.

If the process enters the control routine shown in FIG. 5, the power gradual reduction control period from time A to time B is assigned to a variable τ. For example, if the power gradual reduction control period from time A to time B is t (between 5 and 10 seconds, for example), t is assigned to τ at Step S11. Then, the electric power W supplied to the three-phase stator coil of the assist motor 7 is calculated based on the following operational expression (1) at Step S12. In the expression (1), γ represent the power supplied to the three-phase stator coil of the assist motor 7 at time A. τ is t in the present control cycle but is decreased in the next control cycle by a time interval between the control cycles.

$$W = \beta \times (t - \tau) + \gamma \tag{1}$$

Then, the electric power W supplied to the three-phase stator coil of the assist motor 7 in the present control cycle is updated and stored in the volatile memory such as DRAM or the nonvolatile memory such as EEPROM at Step S13. Then, the ECU 10 outputs a power supply command to the controller 8. Thus, the controller 8 supplies the power W calculated at Steps S11' and S12 to the three-phase stator coil of the assist motor 7 as shown in FIG. 3.

Thus, the electric power W supplied to the three-phase stator coil of the assist motor 7 gradually decreases over time from the electric power γ supplied at time A, at which the supply power attenuation process of gradually reducing over time the electric power W supplied to the three-phase stator coil of the assist motor 7 is started, to the electric power (zero) supplied at time B, at which the process of bringing the electric power W supplied to the three-phase stator coil of the assist motor 7 to zero is executed. Then, it is determined whether τ is zero or lower at Step S14. If Step S14 is NO, τ is decremented at Step S141 and the processes from Step S12 are repeated. If Step S14 is YES, the process of reducing the electric power W supplied to the three-phase stator coil of the assist motor 7 to zero, i.e., process of reducing the motor drive torque to zero at S15, is executed. Then, the control routine shown in FIG. 5 is ended.

The turbocharger engine control system according to the present embodiment starts the supply power attenuation process from a point immediately before the actual supercharging pressure reaches the target supercharging pressure. Thus, the actual supercharging pressure can be prevented from overshooting the target supercharging pressure. While the actual supercharging pressure follows the target supercharging pressure, the electric power supplied to the three-phase stator coil of the assist motor 7 gradually decreases at a predetermined gradient over time. Then, during the supply power attenuation process, at a point when the condition for bringing the electric power supplied to the three-phase stator coil of the assist motor 7 to zero is satisfied (point when the power gradual reduction period elapses from time A), the process of bringing the electric power supplied to the three-phase stator coil of the assist motor 7 to zero (process of bringing the motor drive torque to zero) is executed.

Since the electric power supplied to the three-phase stator coil of the assist motor 7 gradually reduces at a predetermined gradient over a period from time A immediately before the actual supercharging pressure reaches the target supercharging pressure until time when the electric power supplied to the three-phase stator coil of the assist motor 7 becomes zero, a hunting phenomenon, in which the rotation speed of the assist motor 7 decreases and increases, is not caused. Therefore, the assist motor 7 can be turned off while the actual supercharging pressure follows the target supercharging pressure. Thus, wasteful consumption of the electric energy and deterioration of fuel consumption can be prevented. If the electric power supplied to the three-phase stator coil of the assist motor 7 is rapidly brought to zero immediately before the actual supercharging pressure reaches the target supercharging pressure, a step can be produced in the output of the engine 1, causing a sense of discomfort to the vehicle driver. In addition, a large load can be disadvantageously applied to the compressor 21 or the turbine 22 of the turbocharger 6. The present embodiment inhibits these disadvantages.

Time B, at which the process of bringing the electric power supplied to the three-phase stator coil of the assist motor 7 to zero is executed, is estimated immediately before the actual supercharging pressure reaches the target supercharging pressure (at time A) based on the delay characteristics of the actual emission energy. Thus, the gradient $\beta$ of the power gradual reduction waveform in the supply power attenuation process is set such that the electric power supplied to the three-phase stator coil of the assist motor 7 becomes zero at time B. Accordingly, the electric power supplied to the three-phase stator coil of the assist motor 7 gradually reduces at a predetermined gradient over time from time A immediately before the actual supercharging pressure reaches the target supercharging pressure and reaches zero at time B. In consequence, the assist motor 7 can be turned off while the actual supercharging pressure follows the target supercharging pressure to the end, without consuming the electric energy wastefully.

Figure 6A:
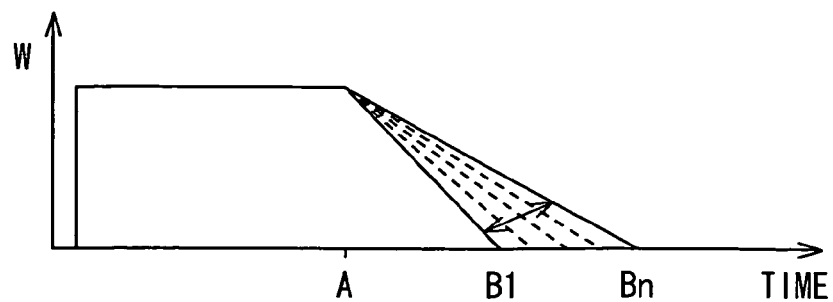
FIG. 6A is a time chart showing the method of the gradual reduction processing of the electric power supplied to the assist motor according to the FIG. 1 embodiment.
Figure 6B:
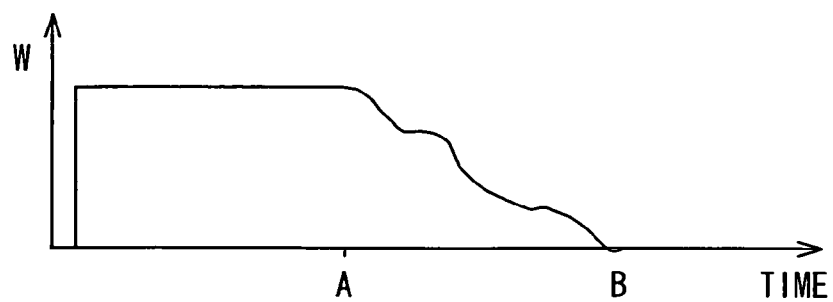
FIG. 6B is a time chart showing a method of gradual reduction processing of electric power supplied to an assist motor according to a second example embodiment of the present invention.

Next, a control method according to a second example embodiment of the present invention will be described in reference to FIG. 6B. FIG. 6B is a time chart showing a method of gradual reduction processing of the electric power supplied to the assist motor.

In this example embodiment, actual emission energy applied to the turbine 22 of the turbocharger 6 is estimated based on an operating state of the engine 1. The exhaust pressure or the exhaust temperature may be obtained by using the engine rpm, the engine load and the like, by using the engine rpm, the accelerator position and the like, or by using the engine rpm, the fuel injection amount and the like. The actual emission energy may be obtained by using the exhaust pressure or the exhaust temperature. Target emission energy necessary for obtaining the target supercharging pressure is calculated based on the operating state of the engine 1 and the target supercharging pressure. An equation of motion of the turbine 22 of the turbocharger 6 may be used to perform inverse operation to obtain the target emission energy from the target supercharging pressure.

In this example embodiment, as shown in the time chart of FIG. 6B, the electric power W supplied to the three-phase stator coil of the assist motor 7 is changed in accordance with a deviation between the actual emission energy and the target emission energy during the the supply power attenuation process. The process of bringing the electric power W supplied to the three-phase stator coil of the assist motor 7 to zero is executed when the actual emission energy reaches the target emission energy. Accordingly, the electric power W supplied to the three-phase stator coil of the assist motor 7 gradually reduces at a predetermined gradient over time from time A immediately before the actual supercharging pressure reaches the target supercharging pressure and finally reaches zero at time B. Thus, the assist motor 7 can be turned off while the actual supercharging pressure follows the target supercharging pressure to the end, without wastefully consuming the electric energy.

Figure 7:
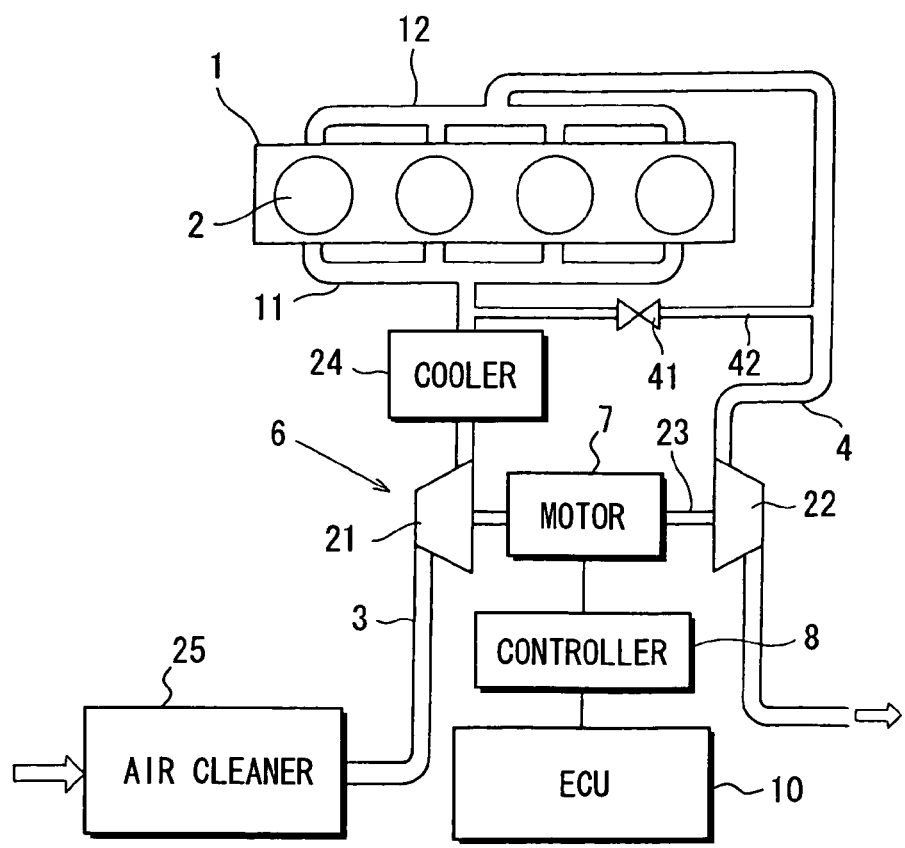
FIG. 7 is a schematic diagram showing a turbocharger engine and its peripheral devices according to a third example embodiment of the present invention.
Figure 8:
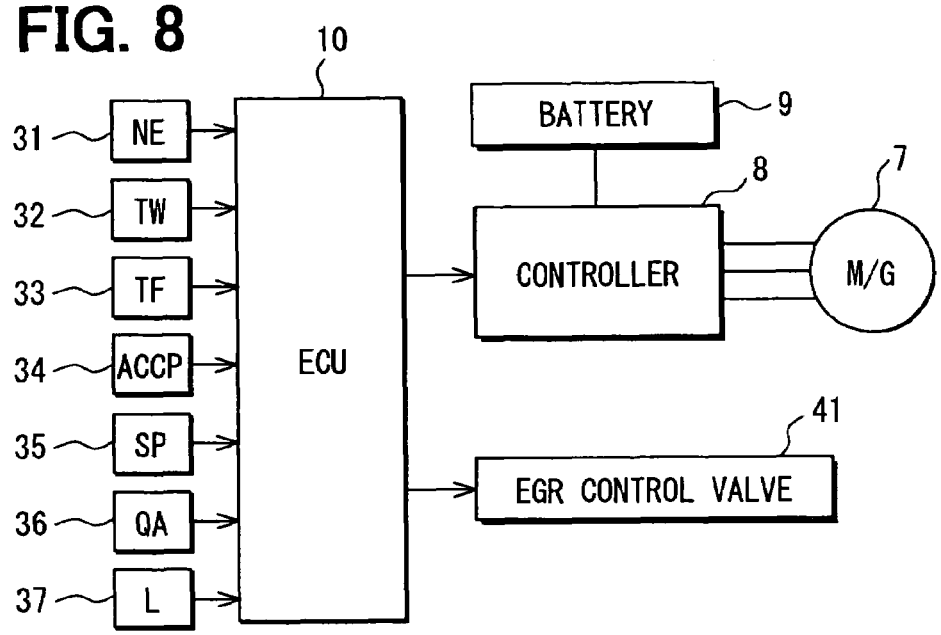
FIG. 8 is a block diagram showing a control structure of a control system of the turbocharger engine according to the FIG. 7 embodiment.

Next, a turbocharger engine control system according to a third example embodiment of the present invention will be described in reference to FIGS. 7 and 8. FIG. 7 is a diagram showing an entire structure of the turbocharger engine control system according to the present embodiment. FIG. 8 is a diagram showing a control structure of the turbocharger engine control system according to the present embodiment.

The turbocharger engine control system according to the present embodiment has an air cleaner case 25 placed in the upstream-most position of the engine intake pipe 3 shown in FIG. 7 for housing a filtering element (air filter) for trapping extraneous matters contained in the intake air. The turbocharger engine control system is equipped with an exhaust gas recirculation apparatus (EGR apparatus) for controlling an opening degree of an exhaust gas recirculation amount control valve 41 (EGR control valve 41) in addition to the common rail fuel injection apparatus, the turbocharger 6 and the assist motor 7. The EGR apparatus is equipped with an exhaust gas recirculation pipe 42 and the EGR control valve 41. The exhaust gas recirculation pipe 42 introduces a part of the exhaust gas flowing through the exhaust passage of the engine exhaust pipe 4 into the intake passage of the engine intake pipe 3. The EGR control valve 41 varies a recirculation amount (EGR amount) of the exhaust gas flowing through the exhaust gas recirculation passage of the exhaust gas recirculation pipe 42 (recirculated exhaust gas, EGR gas).

In the present embodiment, the upstream end of the exhaust gas recirculation pipe 42 with respect to an airflow direction is connected to the engine exhaust pipe 4 connecting the exhaust port of the engine 1 with the turbine 22 of the turbocharger 6. The downstream end of the exhaust gas recirculation pipe 42 with respect to the airflow direction is connected to the engine intake pipe 3 connecting the intake port of the engine 1 with a portion (specifically, an outlet of the intercooler 24) downstream of the compressor 21 of the turbocharger 6 with respect to the airflow direction. The EGR control valve 41 has a valve (valve member), an actuator such as an electromagnetic valve or a drive motor, and valve biasing device such as a spring. The valve changes the exhaust gas flowing area of the exhaust gas recirculation passage of the exhaust gas recirculation pipe 42 to vary the EGR amount (i.e., an EGR ratio to the fresh intake air amount) of the EGR gas, which is a part of the exhaust gas from the engine 1 and is mixed into the intake air. The actuator drives the valve in a valve opening direction. The valve biasing device biases the valve in a valve closing direction.

The recirculation amount (EGR amount) of the EGR gas flowing through the exhaust gas recirculation passage of the exhaust gas recirculation pipe 42 is controlled by correcting the opening degree of the EGR control valve 41 based on an operating state of the engine 1 (e.g., a deviation between the fresh air intake amount and a target air intake amount, the actual supercharging pressure or the actual intake pressure). An EGR drive circuit is provided between the ECU 10 and the actuator of the EGR control valve 41 for applying EGR drive current to the actuator of the EGR control valve 41. An A/D converter performs A/D conversion of various sensor signals of an air flow meter 36 for sensing the fresh air intake amount QA of the engine 1, a lifting distance sensor 37 for sensing a lifting distance L of the EGR control valve 41, and the like. After the A/D conversion, the various sensor signals are input to the microcomputer incorporated in the ECU 10.

Next, a control method according to a fourth example embodiment of the present invention will be described in reference to FIG. 9B. FIG. 9B is a time chart showing a method of gradual reduction processing of the electric power supplied to the assist motor according to the fourth example embodiment.

Figure 9A:
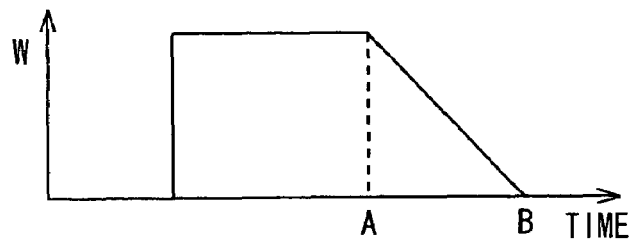
FIG. 9A is a time chart showing the method of the gradual reduction processing of the electric power supplied to the assist motor according to the first example embodiment.
Figure 9B:
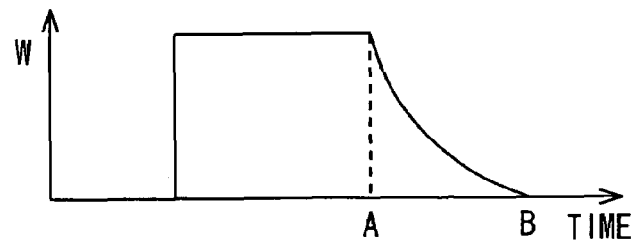
FIG. 9B is a time chart showing a method of gradual reduction processing of electric power supplied to an assist motor according to a fourth example embodiment of the present invention.
Figure 9C:
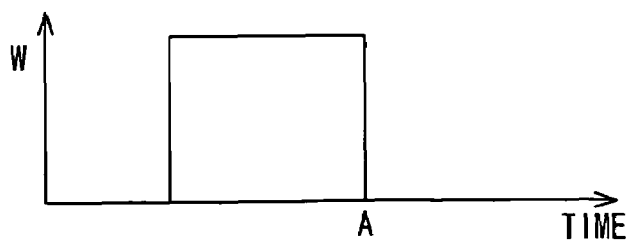
FIG. 9C is a time chart showing a control method of a related art.

In the first example embodiment, as shown in the time chart of FIG. 9A, the supply power attenuation process of gradually reducing the electric power supplied to the three-phase stator coil of the assist motor over time is started at time A immediately before the actual supercharging pressure reaches the target supercharging pressure. The gradient of the power gradual reduction waveform in the supply power attenuation process is set at the downward-sloping linear gradient such that the electric power supplied to the three-phase stator coil of the assist motor 7 is reduced to zero at time B when the process of bringing the electric power supplied to the assist motor 7 to zero is executed.

In the fourth example embodiment, the supply power attenuation process is started at the point A immediately before the actual supercharging pressure reaches the target supercharging pressure as shown in the time chart in FIG. 9B. A power gradual reduction waveform used in the supply power attenuation process is determined by using a second-order lag filter or a third-order lag filter, so that the electric power W supplied to the assist motor 7 becomes zero at time B when the process of bringing the electric power W supplied to the three-phase stator coil of the assist motor 7 to zero is executed. In this case, effects similar to those obtained in the first example embodiment can be achieved.

Thus, in the example embodiments of the present invention, turning off the motor while the actual supercharging pressure follows the target supercharging pressure is achieved by executing the process of reducing the drive torque of the motor at a predetermined gradient from time immediately before the actual supercharging pressure reaches the target supercharging pressure to time when the drive torque of the motor reaches zero. Inhibition of wasteful consumption of electrical energy is achieved by starting the process of reducing the drive torque of the motor at a predetermined gradient based on the actual emission energy applied to the turbine immediately before the actual supercharging pressure reaches the target supercharging pressure.

In the foregoing embodiments, the electric power (motor power) supplied to the three-phase stator coil of the assist motor 7 is regulated based on a control signal (power supply command) from the ECU 10 to control the rotation speed of the assist motor 7. Alternatively, the rotation speed of the assist motor 7 may be controlled by regulating the AC voltage and frequency output from the inverter based on a control signal (power supply command) from the ECU 10. To control the rotation speed of the assist motor 7 is to control the motor drive torque for applying the motor drive force of the assist motor 7 to the turbine shaft (rotor shaft 23).

In the foregoing embodiments, the process of gradually reducing the electric power supplied to the three-phase stator coil of the assist motor 7 at a predetermined gradient over time, i.e., supply power attenuation process, motor drive current gradual reduction process, is executed immediately before the actual supercharging pressure reaches the target supercharging pressure, i.e., when the actual supercharging pressure enters the specific range from the target supercharging pressure. Alternatively, a process of gradually reducing the rotation speed of the motor at a predetermined gradient over time (motor speed gradual reduction process) may be executed immediately before the actual supercharging pressure reaches the target supercharging pressure, i.e., when the actual supercharging pressure enters a specific range from the target supercharging pressure. A process of gradually reducing the drive torque of the motor at a predetermined gradient over time (motor drive torque gradual reduction process) may be performed. A process of gradually reducing the motor drive current applied to the motor at a predetermined gradient over time (motor drive current gradual reduction process) may be executed. A process of gradually reducing the motor drive voltage applied to the motor at a predetermined gradient over time (motor drive voltage gradual reduction process) may be executed.

In the foregoing embodiments, the electric power supplied to the three-phase stator coil of the assist motor 7 is continuously and gradually reduced at a predetermined slope angle (gradient) per unit time from time immediately before the actual supercharging pressure reaches the target supercharging pressure to time set according to an operating state of the engine 1 (specifically, deviation between the actual emission energy and the target emission energy), i.e., from time immediately before the actual supercharging pressure reaches the target supercharging pressure to time when the power gradual reduction control period elapses. Alternatively, the electric power supplied to the three-phase stator coil of the assist motor 7 may be gradually decreased stepwise by a predetermined step amount per unit time. A method of continuously and gradually reducing the supplied energy at a predetermined slope angle (gradient) per unit time and a method of gradually reducing the supplied energy by a predetermined step per unit time may be employed in combination in the power gradual reduction control period.

The AC motor such as a three-phase induction motor generator is used as the assist motor 7 in the foregoing embodiments. Alternatively, a brushless DC motor or a brush DC motor may be used as the assist motor 7. In this case, the motor has only the function of an electric motor. A gear reducer may be provided between the output shaft of the assist motor 7 and the rotor shaft (turbine shaft) 23 for reducing the rotation speed of the output shaft of the assist motor 7 to obtain a predetermined reduction ratio.

In the foregoing embodiments, the supercharging pressure controller for the internal combustion engine of the present invention is applied to a control system for an engine with a turbocharger. Alternatively, the supercharging pressure controller for the internal combustion engine of the present invention may be applied to a supercharging pressure controller for an internal combustion engine having a bypass intake pipe connected to an engine intake pipe and an auxiliary compressor, which is mounted in the bypass intake pipe and is driven by a motor to obtain desired supercharging pressure, in addition to a compressor of a usual turbocharger.

In the foregoing embodiments, the target rotation speed in the present control cycle is calculated based on the deviation between the actual supercharging pressure sensed by the supercharging pressure sensor 35 and the target supercharging pressure, and then the electric power (basic supply power) supplied to the three-phase stator coil of the assist motor 7 necessary for substantially conforming the actual rotation speed of the assist motor 7 to the target rotation speed is calculated. Alternatively, a supercharging assist amount may be calculated based on the deviation between the actual supercharging pressure sensed by the supercharging pressure sensor 35 and the target supercharging pressure, and then target rotation speed in the present control cycle may be calculated in accordance with the supercharging assist amount. Further, the electric power (basic supply power) supplied to the three-phase stator coil of the assist motor 7 necessary for substantially conforming the actual rotation speed of the assist motor 7 to the target rotation speed may be calculated.

Alternatively, the supercharging assist amount may be calculated in accordance with the deviation between the actual supercharging pressure (or intake pressure) and the target supercharging pressure, target (fresh) air intake amount, intake pressure, intake temperature, the engine rpm, the change rate of the accelerator position, the target supercharging pressure, or the torque required by the driver, and then, target rotation speed in the present control cycle may be calculated in accordance with the supercharging assist amount. Further, the electric power (basic supply power) supplied to the three-phase stator coil of the assist motor 7 necessary for substantially conforming the actual rotation speed of the assist motor 7 to the target rotation speed may be calculated. The electric power (basic supply power) supplied to the three-phase stator coil of the assist motor 7 may be calculated in accordance with the deviation between the actual supercharging pressure (or intake pressure) and the target supercharging pressure, the target (fresh) air intake amount, the intake pressure, the intake temperature, the engine rpm, the change rate of the accelerator position, the target supercharging pressure, or the torque required by the driver.

As the supercharging assist control of the assist motor 7 (supercharging pressure control of the engine), the electric current applied to the assist motor 7 (supercharging assist amount) may be feedback-controlled based on the deviation between the actual supercharging pressure and the target supercharging pressure. The electric power supplied to the assist motor 7 (supercharging assist amount) may be feedback-controlled based on the deviation between the target rotation speed and the actual rotation speed of the assist motor 7. The electric power supplied to the assist motor 7 (supercharging assist amount) may be feedback-controlled based on the deviation between the actual supply power supplied to the three-phase stator coil of the assist motor 7 and basic supply power obtained by calculations.

The present invention should not be limited to the disclosed embodiments, but may be implemented in many other ways without departing from the spirit of the invention.

What is claimed is:

1. A supercharging pressure controller for an internal combustion engine, said controller comprising:
   a turbocharger that uses emission energy of exhaust gas flowing out of cylinders of an engine to rotate a turbine and to supercharge intake air suctioned into the cylinders of the engine;
   a motor that drives a compressor or a rotational shaft of the turbocharger;
   a supercharging pressure sensor for sensing supercharging pressure; and
   a motor controller means for controlling drive torque of the motor to substantially conform the actual supercharging pressure sensed by the supercharging pressure sensor to target supercharging pressure,
   wherein the motor controller means starts reducing the drive torque of the motor at a predetermined gradient based on actual emission energy applied to the turbine when the actual supercharging pressure is within a predetermined value from the target supercharging pressure and
   wherein the actual supercharging pressure is lower than the target supercharging pressure before the motor controller starts reducing the drive torque of the motor.

2. The supercharging pressure controller as in claim 1, wherein:
   the motor controller means brings the drive torque of the motor to zero when a condition is satisfied.

3. The supercharging pressure controller as in claim 1, wherein;
   the motor controller means estimates a time to bring the drive torque of the motor to zero when the actual supercharging pressure enters a specific range from the target supercharging pressure wherein the estimated time is based on delay characteristics of the actual emission energy with respect to target emission energy necessary for obtaining the target supercharging pressure, and
   the predetermined gradient is set to bring the drive torque of the motor to zero at a predetermined time based on the actual emission energy at the time the controller begins to reduce the drive torque of the motor.

4. The supercharging pressure controller as in claim 1, wherein the motor controller means:
   estimates the actual emission energy applied to the turbine and sets target emission energy necessary for obtaining the target supercharging pressure,
   changes the drive torque of the motor over an estimated time based on delay characteristics of the actual emission energy with respect to the target emission energy during reduction of the motor drive torque at the predetermined gradient, and
   the drive torque of the motor is brought to zero when the actual emission energy reaches the target emission energy.

5. The supercharging pressure controller as in claim 4, wherein:
   the actual emission energy is estimated based on an operating state of the engine.

6. The supercharging pressure controller as in claim 4, wherein:
   the target emission energy is calculated based on an operating state of the engine and the target supercharging pressure.

7. The supercharging pressure controller as in claim 2, wherein:
   bringing the drive torque of the motor to zero includes bringing power supplied to the motor to zero.

8. The supercharging pressure controller as in claim 1, wherein:
   reducing the drive torque of the motor at the predetermined gradient includes reducing power supplied to the motor at a certain gradient.

9. The supercharging pressure controller as in claim 8, wherein:
   reducing the power supplied to the motor at the certain gradient is continuously performed until power supplied to the motor reaches zero.

10. The supercharging pressure controller as in claim 9, wherein:

supplied power at the start of power reduction is set in accordance with a deviation between actual supercharging pressure and target supercharging pressure.

11. A control method of a supercharging pressure controller for an internal combustion engine having a turbocharger, the control method comprising:
   sensing actual supercharging pressure provided by a turbocharger;
   controlling drive torque of a motor that drives a compressor or a rotational shaft of the turbocharger to substantially conform sensed actual supercharging pressure to target supercharging pressure; and
   reducing drive torque of the motor based on actual emission energy applied to a turbine of the turbocharger at a predetermined gradient or stepwise, wherein said reducing starts immediately when the actual supercharging pressure is within a predetermined value from the target supercharging pressure and
   wherein the actual supercharging pressure is lower than the target supercharging pressure before the motor controller starts reducing the drive torque of the motor.

12. The control method as in claim 11, wherein:
   the drive torque of the motor reaches zero when a predetermined condition is satisfied.

13. The control method as in claim 12, further comprising:
   estimating a time to begin said reducing based on delay characteristics of the actual emission energy with respect to target emission energy necessary for obtaining the target supercharging pressure when the actual supercharging pressure enters a specific range from the target supercharging pressure,
   wherein the predetermined gradient is set to bring the drive torque to zero at a predetermined time based on the actual emission energy.

14. The control method as in claim 11, further comprising:
   estimating the actual emission energy applied to the turbine; and
   setting target emission energy necessary for obtaining the target supercharging pressure,
   wherein the reducing step changes the drive torque over an estimated time based on delay characteristics of the actual emission energy with respect to the target emission energy, and
   the reducing step is ended when the actual emission energy reaches the target emission energy.

15. The control method as in claim 14, wherein:
   the estimating step estimates the actual emission energy based on an operating state of the engine.

16. The control method as in claim 14, wherein:
   the setting step is based on a calculation of the target emission energy as a function of an operating state of the engine and the target supercharging pressure.

17. The control method as in claim 11, wherein:
   the reducing step reduces power supplied to the motor at the predetermined gradient.

18. The control method as in claim 17, wherein:
   the reducing step reduces power supplied to the motor at the predetermined gradient continuously until power supplied to the motor reaches zero.

19. The control method as in claim 18, wherein:
   power supplied to the motor when the reducing step begins is set in accordance with deviation between actual supercharging pressure and target supercharging pressure.

* * * * *